(12) United States Patent
Yan et al.

(10) Patent No.: US 12,438,243 B2
(45) Date of Patent: Oct. 7, 2025

(54) ELECTROCHEMICAL DEVICE AND ELECTRONIC DEVICE

(71) Applicant: Ningde Amperex Technology Limited, Ningde (CN)

(72) Inventors: Kun Yan, Ningde (CN); Yu Ding, Ningde (CN); Yibo Zhang, Ningde (CN); Nan Zhang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 645 days.

(21) Appl. No.: 17/709,943

(22) Filed: Mar. 31, 2022

(65) Prior Publication Data

US 2022/0223983 A1  Jul. 14, 2022

Related U.S. Application Data (63) Continuation of application No. PCT/CN2020/099510, filed on Jun. 30, 2020.

(51) Int. Cl.
*H01M 10/0585* (2010.01)
*H01M 4/505* (2010.01)
(Continued)

(52) U.S. Cl.
CPC ......... *H01M 50/538* (2021.01); *H01M 4/505* (2013.01); *H01M 4/525* (2013.01);
(Continued)

(58) Field of Classification Search
CPC ..................... H01M 2004/029; H01M 50/538
See application file for complete search history.

(56) References Cited

U.S. PATENT DOCUMENTS

| 9,331,358 B2 | 5/2016 | Bhardwaj et al. |
| 9,917,325 B2 | 3/2018 | Bhardwaj et al. |

(Continued)

FOREIGN PATENT DOCUMENTS

| CN | 104143652 A | 11/2014 |
| CN | 105009353 B | 5/2017 |

(Continued)

OTHER PUBLICATIONS

International Search Report and Written Opinion for Application No. PCT/CN2020/099510, mailed on Mar. 31, 2021, 6 pages.

*Primary Examiner* — Nicholas A Smith
*Assistant Examiner* — Zackary Richard Cochenour
(74) *Attorney, Agent, or Firm* — XSENSUS LLP (57) ABSTRACT

An electrochemical device including a bipolar current collector. The bipolar current collector is hermetically connected to an outer package. Cavities independent of each other are formed on two opposite sides of the bipolar current collector. Each cavity contains an electrode assembly and an electrolytic solution. An electrode active material is disposed on at least one surface of the bipolar current collector. Adjacent electrode assemblies are connected in series. The electrochemical device according to this application not only improves the safety of the electrochemical device, but the electrode active material on the surface of the bipolar current collector also participates in a reaction process in the electrochemical device, so that the electrochemical device achieves both a high-voltage output and a relatively high energy density.

19 Claims, 3 Drawing Sheets

(51) Int. Cl.
  *H01M 4/525*    (2010.01)
  *H01M 4/66*     (2006.01)
  *H01M 50/193*   (2021.01)
  *H01M 50/538*   (2021.01)
  *H01M 4/02*     (2006.01)
(52) U.S. Cl.
  CPC ......... *H01M 4/669* (2013.01); *H01M 50/193* (2021.01); *H01M 2004/029* (2013.01)

(56) References Cited

U.S. PATENT DOCUMENTS

| | | | |
|---|---|---|---|
| 2004/0253512 A1* | 12/2004 | Watanabe | H01M 4/131 |
| | | | 429/185 |
| 2011/0091770 A1 | 4/2011 | Han et al. | |
| 2011/0294007 A1* | 12/2011 | Hosaka | H01M 50/423 |
| | | | 29/623.2 |
| 2015/0017522 A1* | 1/2015 | Miyatake | H01M 10/0525 |
| | | | 429/210 |
| 2016/0020481 A1* | 1/2016 | He | H01M 10/0418 |
| | | | 429/185 |

FOREIGN PATENT DOCUMENTS

| | | | |
|---|---|---|---|
| JP | 2010086900 A | 4/2010 | |
| KR | 20080099890 A | 11/2008 | |

* cited by examiner

ELECTROCHEMICAL DEVICE AND ELECTRONIC DEVICE

CROSS REFERENCE TO THE RELATED APPLICATION

This application is a continuation under 35 U.S.C. § 120 of international patent application PCT/CN2020/099510, filed on Jun. 30, 2020, the entire content of which is incorporated herein by reference.

TECHNICAL FIELD

This application relates to the electrochemical field, and in particular, to an electrochemical device and an electronic device containing the electrochemical device.

BACKGROUND

In an existing lithium-ion battery system, an open circuit voltage of a battery can hardly exceeds 5 V due to factors such as a limited voltage difference between a positive electrode material and a negative electrode material and a limited capability of an electrolytic solution in resisting oxidation and reduction. However, in actual use of the battery, there are many scenarios requiring the use of a voltage exceeding 5 V, for example, an electric vehicle (EV), a power tool (PT), and an energy storage system (ESS). Even in a mobile phone market, in order to meet the requirements such as fast charging, the open circuit voltage of a battery cell also needs to be increased. Currently, an output voltage is generally increased by connecting a plurality of batteries in series. However, many problems arise from the practice of connecting a plurality of batteries in series. For example, a capacity difference between individual batteries leads to a relatively low energy density as a whole; and a conducting wire and a contact resistor used for the series connection are additional electronic resistors introduced, consequently causing emission of heat and waste of energy. The higher the voltage, the larger number of individual batteries are required, thereby leading to consequences such as increasing the difficulty of battery management. To solve the foregoing problems, a concept of a high-output-voltage battery is put forward, in which the high-voltage output of an individual battery is implemented by using internal series connection of the battery, thereby reducing the overall heat generated by the battery and reducing the level of temperature rise of the battery in use.

The technique of the series-connected batteries in the prior art is to connect two batteries in series directly in the same packaging bag, without ion insulation between the two series-connected batteries. If the battery voltage rises and the electrolytic solution is decomposed under a high voltage condition, the battery may fail. In addition, an internal short circuit may occur between the two batteries due to the voltage difference between electrode plates, also causing the battery to fail. For such reasons, the solutions in the prior art are merely applicable to batteries with a solid-state electrolyte. However, mainstream lithium batteries contain liquid-state electrolytes. Therefore, the foregoing solutions can hardly be popularized.

SUMMARY

An objective of this application is to provide an electrochemical device to achieve both a high-voltage output and a relatively high energy density.

A first aspect of this application provides an electrochemical device, including a bipolar current collector. The bipolar current collector is hermetically connected to an outer package. Cavities independent of each other are formed on two opposite sides of the bipolar current collector. An electrode assembly and an electrolytic solution are encapsulated in each cavity. An electrode active material is disposed on at least one surface of the bipolar current collector. The electrode assemblies in adjacent cavities are connected in series.

In some embodiments of the first aspect of this application, the cavities are hermetic cavities.

In some embodiments of the first aspect of this application, an electrode active material is disposed on a first surface of the bipolar current collector. A polarity of the electrode active material is opposite to a polarity of an outermost electrode plate of an adjacent electrode assembly. A separator is disposed between the outermost electrode plate and the bipolar current collector. A second surface of the bipolar current collector is electrically insulated from an adjacent electrode assembly.

In some embodiments of the first aspect of this application, tabs are disposed on the bipolar current collector. The tabs are connected in parallel to tabs of a same polarity in the electrode assembly adjacent to the first surface.

In some embodiments of this application, a thickness of the bipolar current collector is 6 μm to 100 μm, and preferably, 10 μm to 55 μm.

In some embodiments of this application, the thickness of the bipolar current collector is 10 μm to 40 μm, and preferably, 20 μm to 30 μm.

In some embodiments of the first aspect of this application, the electrode active material is disposed on a first surface of the bipolar current collector. A polarity of the electrode active material is opposite to a polarity of an outermost electrode plate of an adjacent electrode assembly. A second surface of the bipolar current collector is electrically connected to a current collector of an outermost electrode plate of an adjacent electrode assembly. A polarity of the electrode plate adjacent to the second surface is opposite to the polarity of the electrode active material on the first surface.

In some embodiments of the first aspect of this application, electrode active materials of different polarities are disposed on two surfaces of the bipolar current collector respectively. A polarity of an outermost electrode plate of an electrode assembly adjacent to each surface is different from a polarity of the electrode active material on said surface. A separator is disposed between the outermost electrode plate of the electrode assembly and the bipolar current collector.

In some embodiments of the first aspect of this application, two tabs of opposite polarities are disposed on the electrochemical device. The electrode assemblies of the electrochemical device are connected in series between the two tabs.

In some embodiments of the first aspect of this application, two tabs of opposite polarities are disposed on each of the electrode assemblies. One of the tabs is connected in series to a tab of an adjacent electrode assembly and of an opposite polarity.

In some embodiments of the first aspect of this application, a monitoring tab is further disposed on the bipolar current collector, and the monitoring tab is configured to monitor operating status of the electrode assemblies on the two opposite sides of the bipolar current collector.

In some embodiments of the first aspect of this application, a connecting tab is further disposed on the bipolar current collector. The connecting tab is connected to the tab that serially connects the electrode assemblies on the two opposite sides of the bipolar current collector.

A second aspect of this application provides an electronic device. The electronic device includes the electrochemical device according to the first aspect of this application.

In the electrochemical device according to this application, the bipolar current collector serves a function of physical isolation, and completely isolates the electrode assemblies on the two opposite sides of the bipolar current collector to form independent hermetic cavities, thereby ensuring the normal operation of the electrochemical device and improving the safety of the electrochemical device. In addition, the electrode active material on the surface of the bipolar current collector also participates in an electrochemical reaction process in the electrochemical device, so that the electrochemical device achieves both a high-voltage output and a relatively high energy density. In addition, the bipolar current collector is hermetically connected to the outer package. Therefore, a liquid-state electrolyte is applicable, and therefore, can meet the market demand.

BRIEF DESCRIPTION OF DRAWINGS

To describe the technical solutions in the embodiments of this application and the prior art more clearly, the following briefly describes the drawings that need to be used in the embodiments and the prior art. Evidently, the drawings outlined below are merely a part of the embodiments of this application rather than all embodiments.

REFERENCE NUMERALS

1. Bipolar current collector; 2. Electrode assembly; 201. Electrode assembly; 202. Electrode assembly; 3. Outer package; 4. Bipolar current collector tab; 5. Positive tab; 6. Negative tab; 7. Positive active material; 8. Negative active material; 9. Separator; 10. Positive current collector; 11. Negative current collector; and 12. Sealing region.

DETAILED DESCRIPTION

To make the objectives, technical solutions, and advantages of this application clearer, the following describes this application in more detail with reference to drawings and embodiments. Evidently, the described embodiments are merely a part of but not all of the embodiments of this application.

The electrochemical device according to this application may be any electrochemical device well known by a person skilled in the art, for example, a lithium-ion battery, a sodium-ion battery, a magnesium-ion battery, or a super capacitor. The following description uses a lithium-ion battery as an example. A person skilled in the art understands that the following description is merely exemplary but does not limit the protection scope of this application.

This application provides an electrochemical device, including a bipolar current collector. The bipolar current collector is hermetically connected to an outer package. Hermetic cavities independent of each other are formed on two opposite sides of the bipolar current collector. An electrode assembly and an electrolytic solution are encapsulated in each hermetic cavity. An electrode active material is disposed on at least one surface of the bipolar current collector. The electrode assemblies in adjacent hermetic cavities are connected in series.

Figure 1:
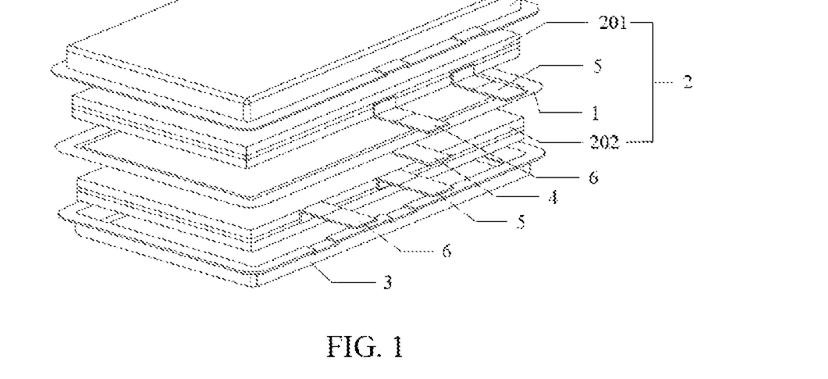
FIG. 1 is a schematic diagram of an electrochemical device according to an embodiment of this application.

FIG. 1 shows an embodiment of this application. The electrochemical device includes a bipolar current collector 1. The bipolar current collector 1 is hermetically connected to an outer package 3. Cavities independent of each other are formed on two opposite sides of the bipolar current collector 1. Each cavity contains an electrode assembly 2 and an electrolytic solution. An electrode active material is disposed on at least one surface of the bipolar current collector 1. Adjacent electrode assemblies 2 are connected in series. The cavities are hermetic cavities.

The bipolar current collector in this application means a current collector of which two opposite sides can be coated with active materials of different polarities concurrently, and possesses the characteristics of both a positive current collector and a negative current collector.

In some embodiments of this application, the bipolar current collector is hermetically connected to the outer package. Hermetic cavities independent of each other are formed on the two opposite sides of the bipolar current collector. The electrode assembly and the electrolytic solution on one side of the bipolar current collector are completely separated from the electrode assembly and the electrolytic solution on the other side, thereby ensuring normal operation of the electrode assemblies on the two opposite sides. In addition, being well hermetic helps to improve the safety of the electrochemical device. In addition, the bipolar current collector possesses the characteristics of electron conducting and ion insulating, thereby avoiding internal short-circuits, decomposition of the electrolytic solution under a high voltage, and internal short-circuits of the electrode assemblies. At least one surface of the bipolar current collector is coated with the electrode active material. The existence of the electrode active material enables the bipolar current collector to participate in the electrochemical reaction of the electrochemical device, thereby effectively increasing the energy density of the electrochemical device. By connecting the adjacent electrode assemblies in series, high-voltage output can be achieved, thereby meeting the demand in the existing market.

In some embodiments of this application, the electrode active material is disposed on a first surface of the bipolar current collector. A polarity of the electrode active material is opposite to a polarity of an outermost electrode plate of an adjacent electrode assembly. A separator is disposed between the outermost electrode plate and the bipolar current collector. A second surface of the bipolar current collector is electrically insulated from an adjacent electrode assembly. In this embodiment, the first surface of the bipolar current collector and the outermost electrode plate of the adjacent electrode assembly constitute an electrochemical unit to participate in the charge and discharge process of the electrochemical device, thereby increasing the energy density of the electrochemical device.

In some embodiments of this application, tabs are disposed on the bipolar current collector. The tabs are connected in parallel to tabs of the same polarity in the electrode assembly adjacent to the first surface. In this embodiment, after being connected in parallel, the tabs are connected in series to the electrode assembly adjacent to the second surface of the bipolar current collector, so as to provide a high-output voltage.

Figure 2:
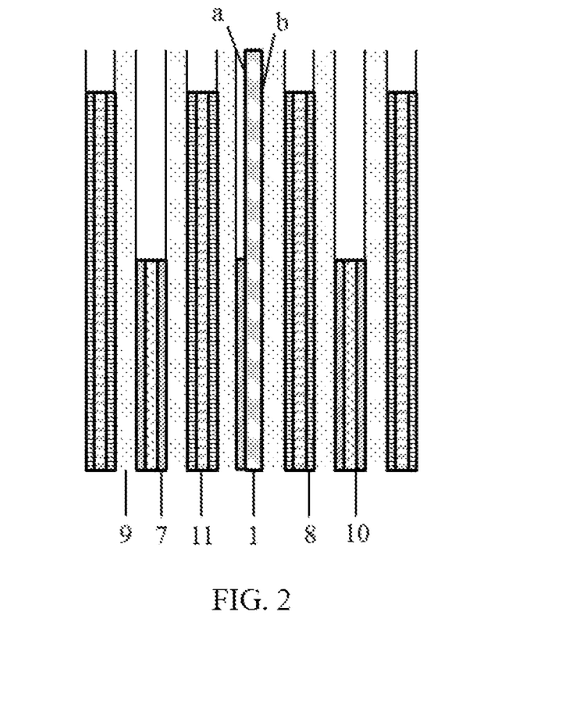
FIG. 2 is a partial schematic diagram of a cross section of an internal structure of an electrochemical device according to an embodiment of this application.

FIG. 2 shows an embodiment of this application. An a-side of the bipolar current collector 1 is coated with a positive active material 7, and a b-side of the bipolar current collector is coated with no electrode active material. An outermost layer of the electrode assembly 201 adjacent to the a-side is coated with a negative active material 8. A separator 9 is disposed on an outermost layer of the electrode assembly 202 adjacent to the b-side. A tab 4 (as shown in FIG. 1) is disposed on the bipolar current collector 1. The tab 4 of the bipolar current collector 1 is connected to the positive tab of the electrode assembly 201 adjacent to the a-side of the bipolar current collector to form a parallel connection, and then connected to the negative tab of the electrode assembly 202 to form a series connection, so as to implement a series connection between the electrode assembly 201 and the electrode assembly 202. A person skilled in the art understands that the positive active material on the a-side of the bipolar current collector may be a negative active material instead. In this case, the outermost layer of the electrode assembly 201 adjacent to the a-side contains the positive active material, the tab of the bipolar current collector is connected to the negative tab of the electrode assembly 201 to form a parallel connection, and then connected to the positive tab of the electrode assembly 202 to form a series connection.

In some embodiments of this application, the electrode active material is disposed on a first surface of the bipolar current collector. The polarity of the electrode active material is opposite to the polarity of an outermost electrode plate of an adjacent electrode assembly. A separator is disposed between the outermost electrode plate and the bipolar current collector. A second surface of the bipolar current collector is electrically connected to a current collector of an outermost electrode plate of an adjacent electrode assembly. The polarity of the outermost electrode plate of the electrode assembly adjacent to the second surface is opposite to the polarity of the electrode active material on the first surface.

In some embodiments of this application, no tab is led out of the bipolar current collector. In this case, the electrode assemblies on the two opposite sides of the bipolar current collector are internally connected in series through the bipolar current collector directly. It is appropriate that just two tabs of opposite polarities are led out of the electrochemical device. In the electrochemical device, all the electrode assemblies are connected in series to each other between the two tabs of opposite polarities through the bipolar current collector.

In some embodiments of this application, it is appropriate that just one tab is led out of the bipolar current collector. The tab is connected to the tab of the same polarity on the electrode assembly on a side that is of the bipolar current collector and that is coated with the electrode active material to form a parallel connection, and then connected to the tab of an opposite polarity on the electrode assembly on the other side to form a series connection. In this case, the two electrode assemblies can be internally connected to each other in series through the bipolar current collector, and externally connected to each other in series through the tabs. In addition, the tabs of the bipolar current collector may be configured to just monitor the voltage of the electrochemical device, without being connected to the tabs of the electrode assemblies.

Figure 3:
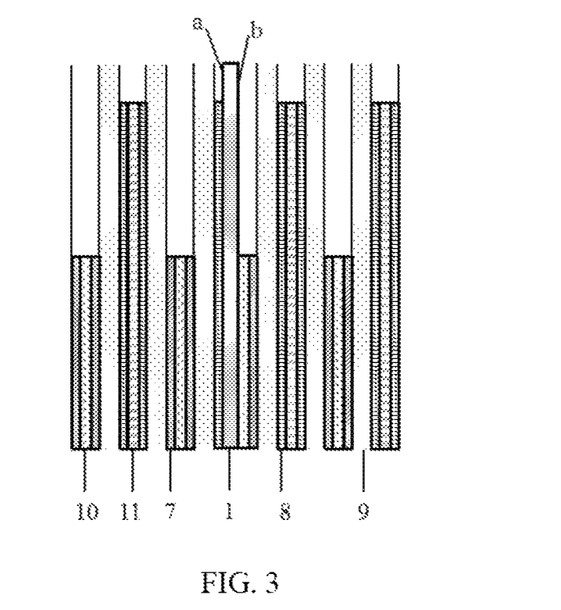
FIG. 3 is a partial schematic diagram of a cross section of an internal structure of an electrochemical device according to another embodiment of this application.

FIG. 3 shows an embodiment of this application. The a-side of the bipolar current collector contains a negative active material 8. The b-side of the bipolar current collector 1 contains no electrode active material. The outermost layer of the electrode assembly 201 adjacent to the a-side of the bipolar current collector 1 is coated with a positive active material 7. The outermost layer of the electrode assembly 202 adjacent to the b-side of the bipolar current collector 1 is a positive current collector 10. An electrical connection is formed between the positive current collector 10 and the b-side of the bipolar current collector 1. The electrode assembly 201 may be connected in series to the electrode assembly 202 through the bipolar current collector 1 directly. A positive tab of the electrode assembly 201 and a negative tab of the electrode assembly 202 are led out and used as a charging tab and a discharging tab of the electrochemical device respectively. In some embodiments of this application, one tab is disposed on the bipolar current collector. The tab is connected to the negative tab of the electrode assembly 201 to form a parallel connection, and then connected to the positive tab of the electrode assembly 202 to form a series connection. In this case, the two electrode assemblies are internally connected to each other in series through the bipolar current collector on the one hand, and externally connected to each other in series through the tabs on the other hand. In addition, the tabs on the bipolar current collector may be configured to just monitor the voltage of the electrochemical device, without being connected to the tabs of the electrode assemblies.

A person skilled in the art understands that the negative active material on the a-side of the bipolar current collector may be a positive active material instead. In this case, the outermost layer of the electrode assembly 201 adjacent to the a-side is coated with the negative active material, the outermost layer of the electrode assembly 202 adjacent to the b-side of the bipolar current collector 1 is a negative current collector, and the electrode assembly 201 and the electrode assembly 202 can be connected to each other in series through the bipolar current collector 1 directly.

In some embodiments of this application, electrode active materials of different polarities are disposed on two surfaces of the bipolar current collector respectively. A polarity of an outermost electrode plate of an electrode assembly adjacent to each surface is different from a polarity of the electrode active material on said surface. A separator is disposed between the outermost electrode plate of the electrode assembly and the bipolar current collector. The two surfaces of the bipolar current collector are coated with the electrode active materials of different polarities respectively. Each of the two surfaces combines with an outermost electrode plate of an adjacent electrode assembly to form an electrochemical unit, thereby further improving the energy density of the battery.

The electrode assemblies on the two opposite sides of the bipolar current collector may be internally connected to each other in series through the bipolar current collector directly, or may be internally connected to each other in series through the bipolar current collector and externally connected to each other in series through the two tabs of opposite polarities.

Figure 5:
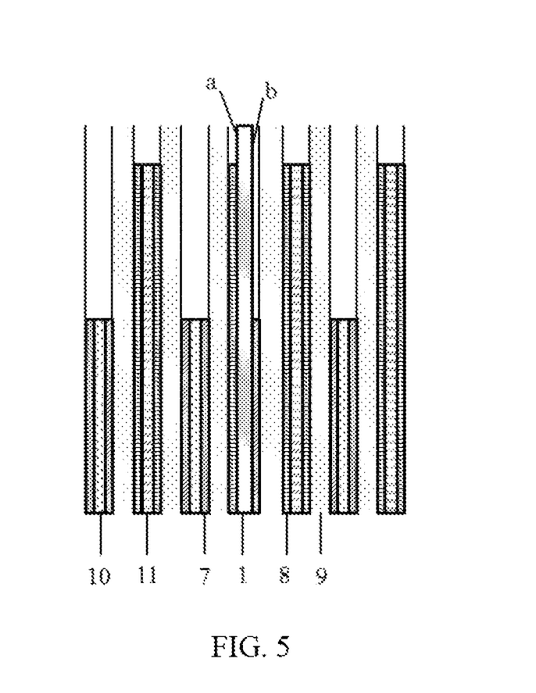
FIG. 5 is a partial schematic diagram of a cross section of an internal structure of an electrochemical device according to another embodiment of this application.

FIG. 5 shows an embodiment of this application. The a-side of the bipolar current collector 1 is coated with a positive active material 7. The b-side of the bipolar current collector 1 is coated with a negative active material 8. The outermost electrode plate of the electrode assembly 201 adjacent to the a-side of the bipolar current collector 1 contains the negative active material 8. The outermost electrode plate of the electrode assembly 202 adjacent to the b-side of the bipolar current collector 1 contains the positive active material 7. The electrode assembly 201 may be internally connected in series to the electrode assembly 202 through the bipolar current collector 1 directly. A negative tab of the electrode assembly 201 and a positive tab of the electrode assembly 202 are led out and used as output tabs of the electrochemical device.

Figure 4:
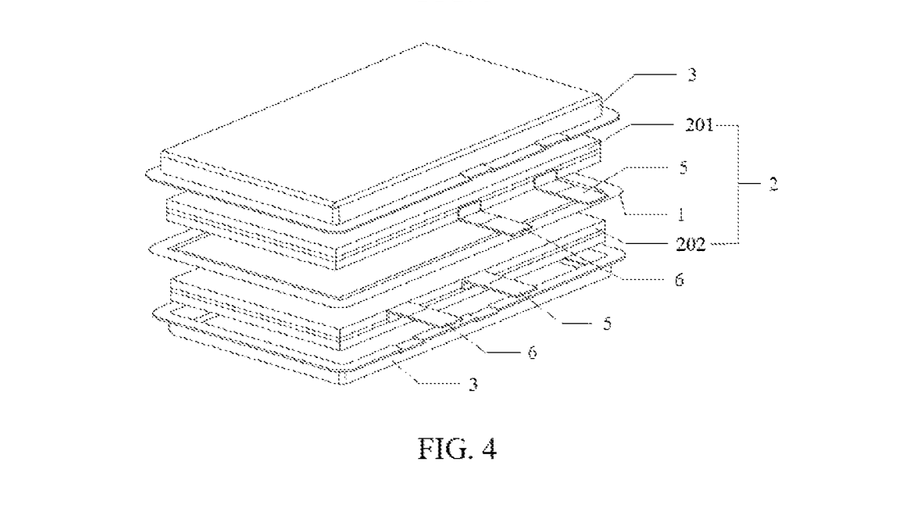
FIG. 4 is a schematic diagram of an electrochemical device according to another embodiment of this application.

In some embodiments of this application, the a-side of the bipolar current collector is coated with a positive active material, and the b-side is coated with a negative active material. The outermost electrode plate of the electrode assembly 201 adjacent to the a-side contains a negative active material, and the outermost electrode plate of the electrode assembly 202 adjacent to the b-side contains a positive active material. All the tabs of the electrode assembly 201 and the electrode assembly 202 are led out. The positive tab of the electrode assembly 201 is connected in series to the negative tab of the electrode assembly 202. In this way, the electrode assembly 201 and electrode assembly 202 are not only internally connected to each other in series through the bipolar current collector, but also externally connected to each other in series through the tabs. The negative tab of the electrode assembly 201 and the positive tab of the electrode assembly 202 are the output tabs of the electrochemical device, as shown in FIG. 4.

In some embodiments of this application, the two surfaces of the bipolar current collector are coated with the electrode active materials of different polarities respectively. One tab is disposed on the bipolar current collector. The tab may be configured to monitor the voltage of the electrochemical device. Alternatively, the tab is coated dielectrically. The tab may be further connected to the tab that serially connects the electrode assemblies on the two opposite sides of the bipolar current collector.

In some embodiments of this application, the bipolar current collector is not particularly limited, as long as the two surfaces of the bipolar current collector can be coated with the electrode active materials of different polarities. Generally, the bipolar current collector needs to be capable of resisting oxidation and reduction and existing stably in the electrolytic solution. For example, the bipolar current collector includes a metallic bipolar current collector or a composite bipolar current collector. The metallic bipolar current collector includes at least one of a copper-aluminum composite current collector or a stainless steel (Ni, Ti, Ag, Au, Pt, or the like) current collector.

The composite bipolar current collector is not particularly limited. For example, a composite bipolar current collector includes a metal and a polymer, where the metal is disposed on the surfaces of the polymer. The metals on the two surfaces may be the same or different. The metal on one surface is electrically connected to the metal on the other surface. In this application, the metal is not particularly limited as long as the metal can achieve the objective of this application. For example, the metal includes two of Cu, Al, Ni, Ti, Ag, Au, Pt, or the like. In this application, the polymer is not particularly limited as long as the polymer can achieve the objective of this application. For example, the polymer is at least one of polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly (vinylidene difluoride-hexafluoropropylene), poly(vinylidene difluoride-co-chlorotrifluoroethylene), organosilicon resin, vinylon, polypropylene, polyethylene, polyvinyl chloride, polystyrene, polyether nitrile, polyurethane, polyphenylene ether, polysulfone, or a derivative thereof.

Another type of composite bipolar current collector includes a one-dimensional or two-dimensional conductive material and a polymer. The conductive material is embedded in the polymer at a specified angle (for example, 0° to 30°) to achieve conductive performance in the thickness direction. The conductive material includes at least one of a carbon material or a metal material. The carbon material includes at least one of single-walled carbon nanotube, multi-walled carbon nanotube, conductive carbon fiber, conductive carbon black, fullerene, conductive graphite, or graphene. The metal material includes at least one of Ni, Ti, Ag, Au, Pt, or stainless steel, or an alloy thereof. The polymer includes at least one of polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly(vinylidene difluoride-hexafluoropropylene), poly(vinylidene difluoride-co-chlorotrifluoroethylene), organosilicon resin, vinylon, polypropylene, polyethylene, polyvinyl chloride, polystyrene, polyether nitrile, polyurethane, polyphenylene ether, polysulfone, or a derivative thereof.

In some embodiments of this application, the thickness of the bipolar current collector is 6 μm to 100 μm, and preferably, 10 μm to 55 μm. In some embodiments of this application, the thickness of the bipolar current collector is 10 μm to 40 μm, and preferably, 20 μm to 30 μm. The bipolar current collector not only possesses the feature of ion insulating, but also needs to possess some mechanical strength. Therefore, if the bipolar current collector is too thin, the mechanical strength will be relatively low, and the bipolar current collector will be prone to break, thereby affecting the performance and even safety of the electrochemical device. If the bipolar current collector is too thick, the conduction of electrons will be affected, and the energy density of the electrochemical device will be reduced, thereby limiting the exertion of the performance of the electrochemical device. The electronic resistivity of the bipolar current collector in the Z direction is $1 \times 10^{-11}$ to 30 Ω·cm, and preferably, $1 \times 10^{-5}$ to 5 Ω·cm, and more preferably, 0.01 to 0.10 Ω·cm.

When the electrode active material on the surface of the bipolar current collector is a positive active material, the thickness of the positive active material is 30 to 120 μm. When the electrode active material on the surface of the bipolar current collector is a negative active material, the thickness of the negative active material is 30 μm to 120 μm. The surface of the bipolar current collector contains the electrode active material, and the electrode active material can participate in the reaction process in the electrochemical device, thereby not only increasing the output voltage but also increasing the energy density of the electrochemical device. In this application, if the electrode active material is too thin, the coating surface will be uneven as affected by the particle size of the product, and the energy that the coating material can exert is low. If the electrode active material is too thick, the electrochemical reaction activity of the battery cell will be affected. Therefore, the electrode active material with a thickness that falls within the foregoing range is conducive to achieving both a high-voltage output and a relatively high energy density.

Figure 6:
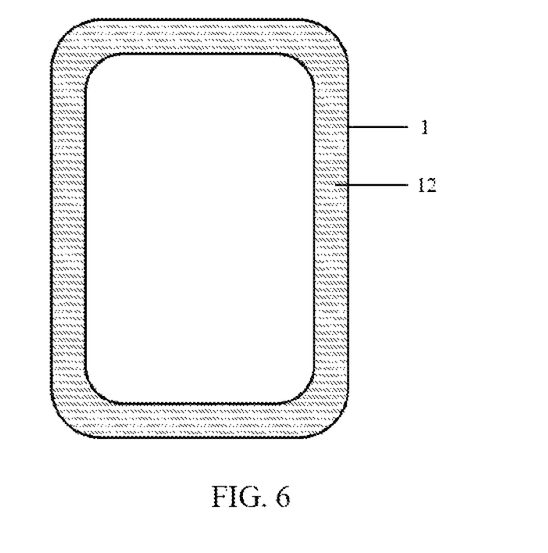
FIG. 6 is a schematic structural diagram of a bipolar current collector according to an embodiment of this application.

In some embodiments of this application, as shown in FIG. 6, the bipolar current collector 1 further includes a sealing region 12. The sealing region 12 is located at a peripheral edge of the bipolar current collector 1. The sealing region further includes a sealing material. The sealing material includes at least one of polypropylene, acid anhydride modified polypropylene, polyethylene, poly(ethylene-co-vinyl acetate), poly(ethylene-co-ethyl acrylate), poly(ethylene-co-acrylate), poly(ethylene-co-vinyl alcohol), polyvinyl chloride, polystyrene, polyether nitrile, polyurethane, polyamide, polyester, poly(amorphous α-co-olefin), or a derivative thereof. The foregoing sealing material can be hermetically connected to the outer package more effectively, thereby helping to improve the safety of the electrochemical device.

In this application, the method of sealing between the bipolar current collector and the outer package is not particularly limited, and may be any sealing method well known in the art. For example, a typical method is to dispose a sealing material at the peripheral edge of the bipolar current collector, and seal the sealing material and the outer package together by hot pressing, so as to form a sealing region in a contact region between the sealing material and the outer package. During the hot-press sealing, the polymer material in the sealing region fuses with the polymer material in the inner layer of the outer package. In this application, the dimensions of the sealing region are not particularly limited as long as the objectives of this application can be achieved. For example, the seal thickness T (unit: mm) and the seal width W (unit: mm) of the sealing region satisfy $0.01 \leq T/W \leq 0.05$. With the ratio of T to W falling within the foregoing range, it is ensured that the battery is well sealed and the service life of the battery is increased. When the ratio of T to W is too low, the seal thickness may be insufficient and the sealing effect may be poor, consequently reducing the environmental stability of the battery. For example, the water vapor in the environment is prone to penetrate into the battery, thereby increasing the moisture content in the battery, decomposing the electrolyte, and reducing the service life of the battery. If the ratio of T to W is too high, the seal width W may be too small, also leading to a poor sealing effect and reducing the environmental stability of the battery. For example, the water vapor in the environment is prone to penetrate into the battery, thereby increasing the moisture content in the battery, causing problems such as electrolyte decomposition, and reducing the service life of the battery. In this application, the seal thickness and seal width are not particularly limited as long as the objectives of this application can be achieved. For example, the seal width is preferably 1 mm to 7 mm.

In a sealing process in this application, the polymer material in the outer package and the polymer material in the sealing material are sealed together by hot pressing. Therefore, the seal thickness includes the thickness of a fusion product of the polymer material in the sealing material and the polymer material in the inner layer of the outer package. The seal width means a width of the sealing region formed by fusing the polymer material in the sealing material and the polymer material in the inner layer of the outer package after the hot-press sealing.

In some embodiments of this application, the electrolytic solution is in any one of the following states: a gel state, a solid state, and a liquid state. In this application, the electrolytic solution is not particularly limited as long as the objectives of this application can be achieved. In some embodiments of this application, structures of the electrode assembly include a wound structure or a stacked structure. The battery assemblies connected in series may be in the same structure or different structures.

In some embodiments of this application, the structure of the electrode assembly is a wound structure, and the electrode assembly includes electrode plates with a single tab or a plurality of tabs. In a case that the electrode assembly includes an electrode plate with a positive tab and a negative tab are led out of the positive electrode plate and the negative electrode plate respectively. In a case that the electrode assembly includes an electrode plates with a plurality of tab pairs, a positive tab and a negative tab may be led out of each coil of positive electrode plate and negative electrode plate respectively, or, a positive tab and a negative tab may be led out of two or more coils of positive electrode plates and negative electrode plates respectively. Ultimately, a wound electrode assembly includes a plurality of pairs of positive tabs and negative tabs. Then, the positive tabs and the negative tabs are connected to a tab lead wire through transfer bonding.

In some embodiments of this application, the structure of the electrode assembly is a stacked structure. In the case that the electrode assembly includes an electrode plate with a plurality of tab, a positive tab and a negative tab may be led out of each layer of positive electrode plate and negative electrode plate respectively. Ultimately, a stacked electrode assembly includes a plurality of pairs of positive tabs and negative tabs. Then, the positive tabs and the negative tabs are connected to a tab lead wire through transfer bonding.

In this application, the welding manner is not particularly limited as long as the objectives of this application can be achieved. For example, the welding manner may be laser welding, ultrasonic welding, resistance welding, or the like.

In some embodiments of this application, the tabs connected in series are distributed in a stacked or staggered manner in the thickness direction of the electrochemical device. In this application, the distribution of the tabs is not particularly limited as long as the objectives of this application can be achieved. In practical applications, the distribution of the tabs may be adjusted as required.

The electrode assembly referred to herein may be an electrode assembly that includes a positive electrode plate, a negative electrode plate, and a separator. The description of this application uses the foregoing electrode assembly as an example. A person skilled in the art understands that the following description is merely exemplary but does not limit the protection scope of this application.

In some embodiments of this application, the positive electrode plate is not particularly limited, as long as the objectives of this application can be achieved. For example, the positive electrode plate generally includes a positive current collector and a positive active material. The positive current collector is not particularly limited in this application, and may be any positive current collector well known in the art. For example, the positive current collector may be a copper foil, an aluminum foil, an aluminum alloy foil, a composite current collector, or the like. The positive active material is not particularly limited, and may be any positive active material in the prior art. For example, the positive active material includes at least one of lithium nickel cobalt manganese oxide, lithium nickel cobalt aluminum oxide, lithium iron phosphate, lithium cobaltate, lithium manganate, or lithium manganese iron phosphate. The thicknesses of the positive current collector and the positive active material are not particularly limited in this application, as long as the objectives of this application can be achieved. For example, the thickness of the positive current collector is 8 μm to 12 μm, and the thickness of the positive active material is 30 μm to 120 μm.

In some preferred embodiments of this application, the positive electrode plate may further include a conductive layer. The conductive layer is located between the positive current collector and the positive active material layer. The composition of the conductive layer is not particularly limited, and may be a conductive layer commonly used in the art. The conductive layer includes a conductive agent and an binder.

In some embodiments of this application, the negative electrode plate is not particularly limited, as long as the objectives of this application can be achieved. For example, the negative electrode plate generally includes a negative current collector and a negative active material. The negative current collector is not particularly limited in this application, and may be any negative current collector well known in the art. For example, the negative current collector may be a copper foil, an aluminum foil, an aluminum alloy foil, a composite current collector, or the like. The negative active material is not particularly limited, and may be any negative active material well known in the art. For example, the negative active material may include at least one of artificial graphite, natural graphite, mesocarbon microbead, silicon, silicon carbon, silicon-oxygen compound, soft carbon, hard carbon, lithium titanium oxide, or niobium titanium oxide. The thicknesses of the negative current collector and the negative active material are not particularly limited in this application, as long as the objectives of this application can be achieved. For example, the thickness of the negative current collector is 6 μm to 10 μm, and the thickness of the negative active material is 30 μm to 120 μm.

In some preferred embodiments of this application, the negative electrode plate may further include a conductive layer. The conductive layer is located between the negative current collector and the negative active material layer. The composition of the conductive layer is not particularly limited, and may be a conductive layer commonly used in the art. The conductive layer includes a conductive agent and an binder.

The conductive agent is not particularly limited, and may be any conductive agent well known in the art, as long as the objectives of this application can be achieved. For example, the conductive agent may include at least one of conductive carbon black (Super P), carbon nanotubes (CNTs), carbon fiber, graphene, or the like. The binder is not particularly limited, and may be any binder well known in the art, as long as the objectives of this application can be achieved. For example, the binder may include at least one of styrene-butadiene rubber (SBR), polyvinyl alcohol (PVA), polytetrafluoroethylene (PTFE), sodium carboxymethyl cellulose (CMC-Na), or the like.

In some embodiments of this application, the separator is not particularly limited, as long as the objectives of this application can be achieved. For example, the thickness of the separator may be 5 μm to 15 μm. The separator may include a polymer or an inorganic substance or the like, which, in each case, is formed of a material that is stable to the electrolytic solution according to this application. In this application, the separator is also known as a separator film.

For example, the separator may include a substrate layer and a surface treatment layer. The substrate layer may be a non-woven fabric, film or composite film, which, in each case, is porous. The material of the substrate layer may include at least one of polyethylene, polypropylene, polyethylene terephthalate, or polyimide. Optionally, the substrate layer may be a polypropylene porous film, a polyethylene porous film, a polypropylene non-woven fabric, a polyethylene non-woven fabric, or a polypropylene-polyethylene-polypropylene porous composite film. Optionally, the surface treatment layer is disposed on at least one surface of the substrate layer. The surface treatment layer may be a polymer layer or an inorganic compound layer, or a layer formed by mixing a polymer and an inorganic compound.

For example, the inorganic compound layer includes inorganic particles and a binder. The inorganic particles are not particularly limited. For example, and the inorganic particles may be at least one selected from: aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is not particularly limited. For example, the binder may be one or more selected from polyvinylidene fluoride, vinylidene fluoride-hexafluoropropylene copolymer, polyamide, polyacrylonitrile, polyacrylate, polyacrylic acid, polyacrylic acid sodium salt, polyvinylpyrrolidone, polyvinyl ether, poly methyl methacrylate, polytetrafluoroethylene, or polyhexafluoropropylene. The polymer layer includes a polymer. The material of the polymer includes at least one of polyamide, polyacrylonitrile, an acrylate polymer, polyacrylic acid, polyacrylate, polyvinylpyrrolidone, polyvinyl ether, polyvinylidene fluoride, or poly(vinylidene fluoride-co-hexafluoropropylene).

The tab referred to herein means a metal conductor led out of a positive electrode plate or a negative electrode plate, and is configured to connect other parts of the electrochemical device in series or in parallel. The positive tab is led out of the positive electrode plate, and the negative tab is led out of the negative electrode plate.

The electrolytic solution referred to herein may include a lithium salt and a nonaqueous solvent. In this application, the lithium salt is not particularly limited, and may be any lithium salt well known in the art, as long as the objectives of this application can be achieved. For example, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, or $LiPO_2F_2$. For example, the lithium salt may be $LiPF_6$. In this application, the nonaqueous solvent is not particularly limited, as long as the objectives of this application can be achieved. For example, the nonaqueous solvent may include at least one of carbonate compound, a carboxylate compound, an ether compound, a nitrile compound, or another organic solvent.

For example, the carbonate compound may include at least one of diethyl carbonate (DEC), dimethyl carbonate (DMC), dipropyl carbonate (DPC), methyl propyl carbonate (MPC), ethylene propyl carbonate (EPC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, I-fluoro-2-methyl ethylene, 1-fluoro-1-methyl ethylene carbonate, 1,2-difluoro-1-methyl ethylene carbonate, 1,1,2-trifluoro-2-methyl ethylene carbonate, or trifluoromethyl ethylene carbonate.

In this application, the outer package is not particularly limited, as long as the objectives of this application can be achieved. For example, the outer package may include an inner layer and an outer layer. The inner layer is hermetically connected to a bipolar current collector. Therefore, the material of the inner layer may include a polymer material, so as to achieve an excellent sealing effect. In addition, the combination of the inner layer and the outer layer can effectively protect an internal structure of the electrochemical device. In this application, the material of the inner layer is not particularly limited as long as the objectives of this application can be achieved. For example, the material of the inner layer includes at least one of polypropylene, polyester, p-hydroxybenzaldehyde, polyamide, polyphenylene ether, polyurethane, or the like. In this application, the material of the outer layer is not particularly limited as long as the objectives of this application can be achieved. For example, the material of the outer layer includes at least one of an aluminum foil, an aluminum oxide layer, a silicon nitride layer, or the like.

In this application, the thickness of the outer package is not particularly limited, as long as the objectives of this application can be achieved. For example, the thickness of the outer package is 60 μm to 200 μm. The outer package of the foregoing thickness can effectively protect the internal structure of the electrochemical device.

In this application, the hermetic connection manner between the bipolar current collector and the outer package is not particularly limited, as long as the objectives of this application can be achieved. For example, the sealing manner includes one of hot pressing, adhesive sealing, and welding. In this application, the hot pressing conditions are not particularly limited, as long as the objectives of this application can be achieved. For example, for an inner layer material that is polypropylene, the hot pressing temperature is 150° C. to 220° C., and the hot pressing pressure is 0.1 MPa to 0.6 MPa.

This application further provides an electronic device. The electronic device includes the electrochemical device according to this application. The electronic device according to this application is not particularly limited, and may be any electronic device known in the prior art. For example, the electronic device includes, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The method for preparing the electrochemical device according to this application is not particularly limited, and may be any method well known in the art. For example, in an embodiment, this application may be prepared by the following method:

(1) Preparing a negative electrode plate: Blending a negative active material and a solvent into a slurry, and stirring the slurry evenly. Coating the negative electrode plate evenly with the slurry, and drying the slurry to obtain a single-side-coated negative electrode plate. Repeating the foregoing steps on the other surface of the negative electrode plate to obtain a double-side-coated negative electrode plate. Then cutting the negative electrode plate properly and leaving it ready for future use.

(2) Preparing a positive electrode plate: Blending a positive active material and a solvent into a slurry, and stirring the slurry evenly. Coating the positive electrode plate evenly with the slurry, and drying the slurry to obtain a single-side-coated positive electrode plate. Repeating the foregoing steps on the other surface of the positive electrode plate to obtain a double-side-coated positive electrode plate. Then cutting the positive electrode plate properly and leaving it ready for future use.

(3) Preparing an electrolytic solution: Mixing a lithium salt and a nonaqueous solvent, and stirring the mixture evenly to obtain an electrolytic solution containing the lithium salt.

(4) Preparing an electrode assembly: Stacking the double-side-coated negative electrode plate, the separator, and the double-side-coated positive electrode plate in sequence, and fixing the stacked layers together for future use, where each electrode assembly contains a positive tab and/or a negative tab. Repeating the foregoing steps to obtain a plurality of electrode assemblies, where the structure of the electrode assemblies may be a wound structure or a stacked structure.

(5) Preparing a bipolar current collector: Coating one surface of the bipolar current collector with a positive active material or a negative active material, drying the active material, and leading out a tab. Alternatively, coating two surfaces of the bipolar current collector with a positive active material and a negative active material respectively, drying the active materials, and leading out a tab or leading out no tab. The thickness of the positive active material and the negative active material on the surfaces of the bipolar current collector is the same as the thickness of the active materials on the positive electrode plate and the negative electrode plate respectively.

(6) Assembling the electrode assembly: Putting the outer package in an assembly jig, and then disposing the electrode assembly apart from the bipolar current collector, with the outer package being adjacent to the electrode assembly. Finally, performing sealing to obtain an assembled electrode assembly.

(7) Electrolyte injection and sealing: Injecting the electrolytic solution into each cavity of the assembled electrode assembly separately, and leading all the tabs of the electrode assembly out of the aluminum plastic film for subsequent processing.

(8.1) Connecting the electrode assemblies in series: Welding the positive tab of one electrode assembly and the negative tab of the other electrode assembly together to implement a series connection between the two electrode assemblies. Repeating the foregoing steps to complete assembling the electrochemical device; or (8.2) Connecting the electrode assemblies in series: Connecting the tab of the bipolar current collector in parallel to the tab of the same polarity of an adjacent electrode assembly, and then welding the positive tabs of the two electrode assemblies together and welding the negative tabs of the two electrode assemblies together to implement a series connection between the two electrode assemblies. Repeating the foregoing steps to complete assembling the electrochemical device.

In the foregoing preparation process, the connection manner of the electrode assemblies may be obtained by referring to different embodiments in the specification, and may be the connection manner described in section (8.1) or the connection manner described in section (8.2).

The electrochemical device according to this application may contain two electrode assemblies, or may contain three or more electrode assemblies. The preparation method of an electrochemical device containing two electrode assemblies or three or more electrode assemblies may be obtained by referring to the foregoing preparation method of an electrochemical device. An electrochemical device containing three or more electrode assemblies also falls within the protection scope defined by the claims of this application.

The terms used in this application are generally terms that are commonly used by a person skilled in the art. If a term used herein is inconsistent with the commonly used terms, the term used in this application prevails. Unless otherwise specified herein. "%" and "fraction" mean a percent by weight.

Test Methods

Energy Density of a Battery

Leaving an electrochemical device to stand at a normal temperature for 30 minutes, charging the electrochemical device at a constant current rate of 0.05 C until the voltage reaches 4.4 V (rated voltage), and then discharging the electrochemical device at a 0.05 C rate until the voltage reaches 3.0 V. Repeating the foregoing charging and discharging steps for 3 cycles to complete chemical formation of the electrochemical device under test. Charging the electrochemical device at a constant current rate of 0.1 C until a voltage of 4.4 V after completion of the chemical formation, and then discharging the electrochemical device at a rate of 0.1 C until a voltage of 3.0 V. Recording a discharge capacity, and then calculating an energy density at the time of discharging at the rate of 0.1 C.

Energy density (Wh/L)=discharge capacity (Wh)/ volume of the electrochemical device (L)

Self-Discharge Rate K of the Lithium-Ion Battery

Discharging the lithium-ion battery at a current of 0.5 C until the voltage reaches 3.0 V, leaving the battery to stand for 5 minutes, then charging the lithium-ion battery at a constant current of 0.5 C until the voltage reaches 3.85 V and then charging the battery at a constant voltage of 3.85 V until the current reaches 0.05 C. Leaving the battery to stand in a 25° C.±5° C. environment for two days, and measuring and recording the voltage OCV 1 at this time. Next, leaving the lithium-ion battery to stand in an environment of 25° C.±5° C. for two days, measuring and recording the voltage OCV2 at this time, and obtaining a K value through the following formula: K(mV/h)=(OCV2−OCV1)/48 h−OCV1.

Discharge Temperature Rise

The test temperature is 25° C. Bonding a temperature probe to the center of a surface of a battery cell to monitor the temperature of the main body of the battery cell. Wrap the surface of the battery cell with foam to weaken the heat exchange between the battery cell and an object that contacts the battery cell. The test process is as follows: Discharging the battery cell at a constant current of 0.2 C until the voltage reaches 6 V (6 V for battery cells connected in series) or 3 V (3 V for a single battery cell in the comparative embodiment, hereinafter the same). Then charging the battery cell at a constant current of 0.5 C until the voltage reaches 8.4 V or 4.2 V. and charging the battery cell at a current of 0.2 C until the voltage reaches 8.9 V or 4.45 V. Leaving the battery cell to stand for 120 minutes until the temperature at the center of the battery cell drops to normal 25° C. Discharging the battery cell by using the same power 15 W, and monitoring the temperature rise of the main body of the battery cell during the discharge.

Nail Penetration Test

Charging a to-be-tested electrochemical device at a constant current of 0.05 C until the voltage reaches 4.45 V (rated voltage in Comparative Embodiment 1) or 8.90 V (rated voltage in other comparative embodiments and all embodiments), and then charging the electrochemical device at a constant voltage until the current reaches 0.025 C (cut-off current) so that the electrochemical device reaches a fully charged state. Recording the appearance of the electrochemical device before the nail penetration test. Performing a nail penetration test on the electrochemical device in an environment of 25° C. The nail is 4 mm in diameter, and the penetration speed is 30 mm/s. One nail penetration position is 15 mm distant from the edge of the electrode assembly with a positive tab, and the other nail penetration position is 15 mm distant from the edge of the electrode assembly with a negative tab. Stopping the nail penetration test when the test lasts 3.5 minutes or when the surface temperature of the electrode assembly drops to 50° C. Observing the battery status during the test by using 10 battery cells as a group, and determining pass of a test if the battery does not burn or explode.

Alternating-Current Impedance Test

Performing the test with an internal resistance meter, where excitation signals to the electrochemical device are 1 KHz and 10 mA.

Embodiment 1

(1) Preparing a negative electrode plate: Mixing artificial graphite as a negative active material, conductive carbon black (Super P), and the styrene butadiene rubber (SBR) at a weight ratio of 96:1.5:2.5, adding deionized water as a solvent, blending the mixture into a slurry with a solid content of 70 wt %, and stirring the slurry evenly. Coating one surface of a 10 sum-thick negative current collector copper foil evenly with the slurry, and drying the slurry at a temperature of 110° C. to obtain a negative electrode plate of which a single side is coated with a 150 μm-thick negative active material layer. Repeating the foregoing steps on the other surface of the negative electrode plate to obtain a negative electrode plate of which both sides are coated with the negative active material layer. Then cutting the negative electrode plate into a size of 41 mm×61 mm for future use.

(2) Preparing a positive electrode plate: Mixing lithium cobalt oxide ($LiCoO_2$) as a positive active material, conductive carbon black (super P), and polyvinylidene difluoride (PVDF) at a weight ratio of 97.5:1.0:1.5, adding N-methyl pyrrolidone (NMP) as a solvent, blending the mixture into a slurry with a solid content of 75 wt %, and stirring the slurry evenly. Coating a 12 μm-thick positive current collector aluminum foil evenly with the slurry, and drying the slurry at a temperature of 90° C. to obtain a positive electrode plate coated with a positive active material layer that is 100 μm in thickness. Repeating the foregoing steps on the other surface of the positive current collector aluminum foil to obtain a positive electrode plate of which both sides are coated with the positive active material layer. Then cutting the positive electrode plate into a size of 38 mm×58 mm for future use.

(3) Preparing an electrolytic solution: Mixing ethylene carbonate (EC), ethyl methyl carbonate (EMC), and diethyl carbonate (DEC) at a weight ratio of EC:EMC:DEC=30:50:20 in an dry argon atmosphere to form an organic solvent, then adding lithium salt hexafluorophosphate ($LiPF_6$) into the organic solvent to dissolve, and mixing the solution evenly to obtain an electrolytic solution in which a lithium salt concentration is 1.15 mol/L.

(4) Preparing an electrode assembly A: Stacking the separator, the double-side-coated negative electrode plate, the separator, and the double-side-coated positive electrode plate in sequence to form a stacked plate, and then fixing the four corners of the entire stacked plate structure for future use. The electrode assembly A includes a positive tab and a negative tab. The separator is a 15 μm-thick polyethylene (PE) film.

(5) Preparing an electrode assembly B: Stacking the double-side-coated negative electrode plate, the separator, the double-side-coated positive electrode plate and the separator in sequence to form a stacked plate, and then fixing the four corners of the entire stacked plate structure for future use. The electrode assembly B includes a positive tab and a negative tab. The separator is a 15 μm-thick polyethylene (PE) film.

(6) Preparing a bipolar current collector: Using a 30 μm-thick copper-aluminum composite current collector as the bipolar current collector. Coating one surface of the copper-aluminum composite current collector evenly with the negative active material slurry in step (1), and drying the slurry at 110° C. to obtain a negative active material layer that is 150 μm in thickness. Then coating the other surface of the copper-aluminum composite current collector evenly with the positive active material slurry in step (2), and drying the slurry at 90° C. to obtain a positive active material layer that is 100 μm in thickness. The sealing region of the bipolar current collector contains a sealing material, that is, polypropylene (PP). The polypropylene sealing material is 20 μm in thickness and 3 mm in width. The sealing region is coated with no electrode active material.

(7) Assembling the electrode assembly A: Putting a punch-molded aluminum plastic film into an assembly jig, with a pit side facing upward. Putting the electrode assembly A into the pit, with the separator side facing upward. Then leaving a side of the bipolar current collector to face downward, where the side is coated with the positive active material. Putting the bipolar current collector onto the electrode assembly A, so that the active material coating regions correspond to each other, where the positive active material of the bipolar current collector is separated from the active material of the negative electrode plate by the separator. Pressing tightly with an external force to obtain a semi-finished assembly.

(8) Assembling the electrode assembly B: Putting the semi-finished assembly into the assembly jig, and leaving a side of the bipolar current collector to face upward, where the side is coated with the negative active material. Leaving the separator side of the electrode assembly B to face downward. Putting the electrode assembly B onto the bipolar current collector, so that the active material coating regions correspond to each other. Pressing tightly with an external force. Then overlaying the electrode assembly B with the punch-molded aluminum plastic film, with a pit side facing downward. Hot-sealing the peripheral edge by hot pressing to obtain an assembled electrode assembly. The hot-pressing temperature is 185° C., the hot-pressing pressure is 0.5 MPa, the width of the sealing region is 2 mm, and the thickness of the sealing region is 0.03 mm.

(9) Electrolyte injection and sealing: Injecting the electrolytic solution into two cavities of the assembled electrode assembly separately, and leading all the tabs of the electrode assemblies A and B out of the aluminum plastic film for subsequent processing.

(10) Connecting the electrode assemblies in series: Welding the positive tab of the electrode assembly A and the negative tab of the electrode assembly B together by means of laser welding to implement a series connection between the electrode assemblies A and B. In this way, the assembling of the battery is completed.

Embodiment 2

This embodiment is the same as Embodiment 1 except that the bipolar current collector is a composite bipolar current collector, that is, a thin film made by inserting conductive carbon fiber into a PE substrate.

Embodiment 3

This embodiment is the same as Embodiment 1 except that the bipolar current collector is stainless steel metal foil.

Embodiment 4

This embodiment is the same as Embodiment 1 except that the bipolar current collector is a composite bipolar current collector, that is, a thin film made by inserting conductive carbon fiber into a PE substrate, and except that the thickness is 6 μm.

Embodiment 5

This embodiment is the same as Embodiment 1 except that the bipolar current collector is a composite bipolar current collector, that is, a thin film made by inserting conductive carbon fiber into a PE substrate, and except that the thickness is 100 μm.

Embodiment 6

This embodiment is the same as Embodiment 1 except that the bipolar current collector is a composite bipolar current collector, that is, a thin film made by inserting conductive carbon fiber into a PE substrate, and except that the thickness is 55 μm.

Embodiment 7

This embodiment is the same as Embodiment 1 except that a monitoring tab is led out of the bipolar current collector. The monitoring tab is configured to detect the voltage of the electrochemical device.

Embodiment 8

This embodiment is the same as Embodiment 7 except that the bipolar current collector is a composite bipolar current collector, that is, a thin film made by inserting conductive carbon fiber into a PE substrate.

Embodiment 9

This embodiment is the same as Embodiment 7 except that the bipolar current collector is stainless steel metal foil.

Embodiment 10

The preparation steps (1) to (4) are the same as those of Embodiment 1.

(5) Preparing an electrode assembly B: Stacking the separator, the double-side-coated negative electrode plate, the separator, the double-side-coated positive electrode plate, and the separator, in sequence to form a stacked plate, and then fixing the four corner of the entire stacked plate structure for future use. The electrode assembly B includes a positive tab and a negative tab. The separator is a 15 μm-thick polyethylene (PE) film.

(6) Preparing an electrode assembly C: Stacking the double-side-coated negative electrode plate, the separator, the double-side-coated positive electrode plate, and the separator, in sequence to form a stacked plate, and then fixing the four corners of the entire stacked plate structure for future use. The electrode assembly C includes a positive tab and a negative tab. The separator is a 15 μm-thick polyethylene (PE) film.

(7) Preparing a bipolar current collector I and a bipolar current collector II: The bipolar current collector is a composite bipolar current collector, that is, a thin film made by inserting conductive carbon fiber into a PE substrate, and except that the thickness is 30 μm. Coating one surface of the composite bipolar current collector evenly with the negative active material slurry in step (1), and drying the slurry at 110° C. to obtain a negative active material layer that is 150 μm in thickness. Then coating the other surface of the composite bipolar current collector evenly with the positive active material slurry in step (2), and drying the slurry at 90° C. to obtain a positive active material layer that is 100 μm in thickness. The sealing region of the bipolar current collector contains a sealing material, that is, polypropylene (PP). The polypropylene sealing material is 20 μm in thickness and 3 mm in width. The sealing region is coated with no electrode active material.

(8) Assembling the electrode assembly A: Putting a punch-molded aluminum plastic film into an assembly jig, with a pit side facing upward. Putting the electrode assembly A into the pit, with the separator side facing upward. Then leaving a side of the bipolar current collector I to face downward, where the side is coated with the positive active material. Putting the bipolar current collector I onto the electrode assembly A, so that the active material coating regions correspond to each other. Pressing tightly with an external force to obtain a semi-finished assembly.

(9) Assembling the electrode assembly B: Putting the semi-finished assembly into the assembly jig, and leaving a side of the bipolar current collector I to face upward, where the side is coated with the negative active material. Leaving a separator side of the electrode assembly B to face downward, where the side is close to the positive electrode plate. Putting the electrode assembly B onto the bipolar current collector I, so that the active material coating regions correspond to each other. Pressing tightly with an external force to obtain a semi-finished assembly 2.

(10) Assembling the electrode assembly C: Putting the semi-finished assembly into the assembly jig. Leaving the separator side of the electrode assembly B to face upward, where the side is close to the negative electrode plate. Leaving a side of the bipolar current collector II downward, where the side is coated with the positive active material. Putting the bipolar current collector II onto the electrode assembly B. Then leaving the separator side of the electrode assembly C to face downward, and putting the electrode assembly C onto the bipolar current collector II, so that the active material coating regions correspond to each other. Pressing tightly with an external force. Then putting the punch-molded aluminum plastic film onto the electrode assembly C. Hot-sealing the peripheral edge by hot pressing to obtain an assembled electrode assembly. The hot-pressing temperature is 185° C., the hot-pressing pressure is 0.5 MPa, the width of the sealing region is 2 mm, and the thickness of the sealing region is 0.03 mm.

(11) Electrolyte injection and sealing: Injecting the electrolytic solution into three cavities of the assembled electrode assembly separately, and leading all the tabs of the electrode assemblies A, B, and C out of the aluminum plastic film for subsequent processing.

(12) Connecting the electrode assemblies in series: Welding the positive tab of the electrode assembly A and the negative tab of the electrode assembly B together by means of laser welding to implement a series connection between the electrode assemblies A and B. Welding the positive tab of the electrode assembly B and the negative tab of the electrode assembly C together by means of laser welding to implement a series connection between the electrode assemblies B and C. In this way, the assembling of the battery is completed.

Embodiment 11

The preparation steps (1) to (4) are the same as those of Embodiment 1.

(5) Preparing an electrode assembly B: Stacking the separator, the double-side-coated negative electrode plate, the separator, and the double-side-coated positive electrode plate in sequence to form a stacked plate, and then fixing the four corners of the entire stacked plate structure for future use. The electrode assembly B includes a positive tab and a negative tab. The separator is a 15 μm-thick polyethylene (PE) film.

(6) Preparing a bipolar current collector: The bipolar current collector is a composite bipolar current collector, that is, a thin film made by inserting conductive carbon fiber into a PE substrate. The thickness of the thin film is 30 μm. Coating one surface of the composite bipolar current collector evenly with the positive active material slurry in step (2), and drying the slurry at 90° C. to obtain a positive active material layer that is 100 μm in thickness. At the same time, leading one connecting tab out of the bipolar current collector for future use. An outer contour sealing region of the bipolar current collector contains a sealing material, that is, polypropylene (PP). The polypropylene coating is 20 μm in thickness and 3 mm in width. The outer contour sealing region is coated with no electrode active material.

(7) Assembling the electrode assembly A: Putting a punch-molded aluminum plastic film into an assembly jig, with a pit side facing upward. Putting the electrode assembly A into the pit, with the separator side facing upward. Then leaving a side of the bipolar current collector to face downward, where the side is coated with the positive active material. Putting the bipolar current collector onto the electrode assembly A, so that the active material coating regions correspond to each other. Pressing tightly with an external force to obtain a semi-finished assembly.

(8) Assembling the electrode assembly B: Putting the semi-finished assembly into the assembly jig, and leaving a side of the bipolar current collector to face upward, where the side is coated with no electrode active material. Leaving the separator side of the electrode assembly B to face downward. Putting the electrode assembly B onto the bipolar current collector to align with the edges of the semi-finished assembly. Pressing tightly with an external force. Then overlaying the electrode assembly B with the punch-molded aluminum plastic film, with a pit side facing downward. Hot-sealing the peripheral edge by hot pressing to obtain an assembled electrode assembly. The hot-pressing temperature is 185° C., the hot-pressing pressure is 0.5 MPa, the width of the sealing region is 2 mm, and the thickness of the sealing region is 0.03 mm.

(9) Electrolyte injection and sealing: Injecting the electrolytic solution into two cavities of the assembled electrode assembly separately, and leading all the tabs of the electrode assemblies A and B and the tab of the bipolar current collector out of the aluminum plastic film for subsequent processing.

(10) Connecting the electrode assemblies in series: Welding the positive tab of the electrode assembly A and the connecting tab of the bipolar current collector together by means of laser welding, and then welding the negative tab of the electrode assembly B and the connecting tab of the bipolar current collector together by means of laser welding, so as to implement a series connection between the electrode assemblies A and B. In this way, the assembling of the battery is completed.

Embodiment 12

The preparation steps (1) to (3) are the same as those of Embodiment 1.

(4) Preparing an electrode assembly A: Stacking the separator, the double-side-coated negative electrode plate, the separator, and the double-side-coated positive electrode plate in sequence to form a stacked plate, and then fixing the four corners of the entire stacked plate structure for future use. The electrode assembly A includes a positive tab. The separator is a 15 μm-thick polyethylene (PE) film.

(5) Preparing an electrode assembly B: Stacking the single-side-coated negative electrode plate, the separator, and the double-side-coated positive electrode plate in sequence to form a stacked plate, with the uncoated side of the negative electrode plate facing outward. Then fixing the four corners of the entire stacked plate structure for future use. The electrode assembly B includes a negative tab. The separator is a 15 μm-thick polyethylene (PE) film.

(6) Preparing a bipolar current collector: The bipolar current collector is a composite bipolar current collector, that is, a thin film made by inserting conductive carbon fiber into a PE substrate. The thickness of the thin film is 30 μm. Coating one surface of the composite bipolar current collector evenly with the positive active material slurry in step (2), and drying the slurry at 90° C. to obtain a positive active material layer that is 100 μm in thickness. An outer contour sealing region of the bipolar current collector contains a sealing material, that is, polypropylene (PP). The polypropylene sealing material is 20 μm in thickness and 3 mm in width. The outer contour sealing region is coated with no electrode active material.

(7) Assembling the electrode assembly A: Putting a punch-molded aluminum plastic film into an assembly jig, with a pit side facing upward. Putting the electrode assembly A into the pit, with the separator side facing upward. Then leaving a side of the bipolar current collector to face downward, where the side contains the positive active material. Putting the bipolar current collector onto the electrode assembly A, so that the active material coating regions correspond to each other. Pressing tightly with an external force to obtain a semi-finished assembly.

(8) Assembling the electrode assembly B: Putting the semi-finished assembly into the assembly jig, and leaving a side of the bipolar current collector to face upward, where the side contains no electrode active material. Leaving the uncoated side of the negative electrode plate of the electrode assembly B to face downward. Putting the electrode assembly B onto the bipolar current collector to align with the edges of the semi-finished assembly. Pressing tightly with an external force. Then overlaying the electrode assembly B with the punch-molded aluminum plastic film, with a pit side facing downward. Hot-sealing the peripheral edge by hot pressing to obtain an assembled electrode assembly. The hot-pressing temperature is 185° C., the hot-pressing pressure is 0.5 MPa, the width of the sealing region is 2 mm, and the thickness of the sealing region is 0.03 mm.

(9) Electrolyte injection and sealing: Injecting the electrolytic solution into two cavities of the assembled electrode assembly separately, and leading the positive tab of the electrode assembly A and the negative tab of the electrode assembly B out of the aluminum plastic film for subsequent processing.

(10) Connecting the electrode assemblies in series: The negative tab of the electrode assembly B is in contact with the uncoated side of the bipolar current collector to form an electrical connection to implement a series connection between the electrode assemblies A and B. The positive tab of the electrode assembly A and the negative tab of the electrode assembly B are output tabs. In this way, the assembling of the battery is completed.

Embodiment 13

The preparation steps (1) to (5) are the same as those of Embodiment 1.

(6) Preparing a bipolar current collector. The bipolar current collector is a composite bipolar current collector, that is, a thin film made by inserting conductive carbon fiber into a PE substrate. The thickness of the thin film is 30 μm. Coating one surface of the composite bipolar current collector evenly with the positive active material slurry in step (2), and drying the slurry at 90° C. to obtain a positive active material layer that is 100 μm in thickness. At the same time, leading one monitoring tab out of the bipolar current collector for future use. An outer contour sealing region of the bipolar current collector contains a sealing material, that is, polypropylene (PP). The polypropylene sealing material is 20 μm in thickness and 3 mm in width. The outer contour sealing region is coated with no electrode active material.

(7) Assembling the electrode assembly A: Putting a punch-molded aluminum plastic film into an assembly jig, with a pit side facing upward. Putting the electrode assembly A into the pit, with the separator side facing upward. Then leaving a side of the bipolar current collector to face downward, where the side contains the positive active material. Putting the bipolar current collector onto the electrode assembly A, so that the active material coating regions correspond to each other. Pressing tightly with an external force to obtain a semi-finished assembly.

(8) Assembling the electrode assembly B: Putting the semi-finished assembly into the assembly jig, and leaving a side of the bipolar current collector to face upward, where the side contains no electrode active material. Leaving the uncoated side of the negative electrode plate of the electrode assembly B to face downward. Putting the electrode assembly B onto the bipolar current collector to align with the edges of the semi-finished assembly. Pressing tightly with an external force. Then overlaying the electrode assembly B with the punch-molded aluminum plastic film, with a pit side facing downward. Hot-sealing the peripheral edge by hot pressing to obtain an assembled electrode assembly. The hot-pressing temperature is 185° C., the hot-pressing pressure is 0.5 MPa, the width of the sealing region is 2 mm, and the thickness of the sealing region is 0.03 mm.

(9) Electrolyte injection and sealing: Injecting the electrolytic solution into two cavities of the assembled electrode assembly separately, and leading all the tabs of the electrode assemblies A and B out of the aluminum plastic film for subsequent processing.

(10) Connecting the electrode assemblies in series: Welding the negative tab of the electrode assembly A and the positive tab of the electrode assembly B together by means of laser welding to implement a series connection between the electrode assemblies A and B. The monitoring tab of the bipolar current collector is configured to monitor the voltage of the electrochemical device. In this way, the assembling of the battery is completed.

Embodiment 14

This embodiment is the same as Embodiment 1 except that the thickness of the bipolar current collector is 10 μm.

Embodiment 15

This embodiment is the same as Embodiment 1 except that the thickness of the bipolar current collector is 40 μm.

Embodiment 16

This embodiment is the same as Embodiment 1 except that the thickness of the bipolar current collector is 25 μm.

Embodiment 17

(1) Preparing a negative electrode plate: This embodiment is the same as Embodiment 1 except that the negative electrode plate is cut into a size of 41 mm×550 mm for future use.

(2) Preparing a positive electrode plate: This embodiment is the same as Embodiment 1 except that the positive electrode plate is cut into a size of 35 mm×547 mm for future use.

(3) Preparing an electrolytic solution: Mixing ethylene carbonate (EC), ethyl methyl carbonate (EMC), and diethyl carbonate (DEC) at a weight ratio of EC:EMC:DEC=30:50:20 in an dry argon atmosphere to form an organic solvent, then adding lithium salt hexafluorophosphate ($LiPF_6$) into the organic solvent to dissolve, and mixing the solution evenly to obtain an electrolytic solution in which a lithium salt concentration is 1.15 mol/L.

(4) Preparing the electrode assembly A and the electrode assembly B: Stacking the separator, the double-side-coated negative electrode plate, the separator, and the double-side-coated positive electrode plate in sequence, and then winding the plates by starting from one end to ultimately wind into a wound roll, with the negative electrode plate or the positive electrode plate can be located on the outermost side. Each electrode assembly includes a positive tab and a negative tab. The separator is a 15 μm-thick polyethylene (PE) film.

(5) Preparing a bipolar current collector: Using a 30 μm-thick copper-aluminum composite current collector as the bipolar current collector. Coating one surface of the copper-aluminum composite current collector evenly with the negative active material slurry in step (1), and drying the slurry at 110° C. to obtain a negative active material layer that is 150 μm in thickness. Then coating the other surface of the copper-aluminum composite current collector evenly with the positive active material slurry in step (2), and drying the slurry at 90° C. to obtain a positive active material layer that is 100 μm in thickness. The sealing region of the bipolar current collector contains a sealing material, that is, polypropylene (PP). The polypropylene sealing material is 20 μm in thickness and 3 mm in width. The sealing region is coated with no electrode active material.

(6) Assembling the electrode assembly A: Putting a punch-molded aluminum plastic film into an assembly jig, with a pit side facing upward. Putting the electrode assembly A into the pit. Then leaving a side of the bipolar current collector to face downward, where the side contains the positive active material. Putting the bipolar current collector onto the electrode assembly A, so that the active material coating regions correspond to each other. Pressing tightly with an external force to obtain a semi-finished assembly.

(7) Assembling the electrode assembly B: Putting the semi-finished assembly into the assembly jig, and leaving a side of the bipolar current collector to face upward, where the side contains the negative active material. Putting the electrode assembly B onto the bipolar current collector. A side that is of the separator and that is close to the positive electrode plate in the electrode assembly B is adjacent to the bipolar current collector. In this way, the active material coating regions correspond to each other. Pressing tightly with an external force. Then overlaying the electrode assembly B with the punch-molded aluminum plastic film, with a pit side facing downward. Hot-sealing the peripheral edge by hot pressing to obtain an assembled electrode assembly. The hot-pressing temperature is 185° C., the hot-pressing pressure is 0.5 MPa, the width of the sealing region is 2 mm, and the thickness of the sealing region is 0.03 mm.

(8) Electrolyte injection and sealing: Injecting the electrolytic solution into two cavities of the assembled electrode assembly separately, and leading all the tabs of the electrode assemblies A and B out of the aluminum plastic film for subsequent processing.

(9) Connecting the electrode assemblies in series: Welding the positive tab of the electrode assembly A and the negative tab of the electrode assembly B together by means of laser welding to implement a series connection between the electrode assemblies A and B. In this way, the assembling of the battery is completed.

Comparative Embodiment 1

This comparative embodiment is the same as Embodiment 1 except: the bipolar current collector is replaced with a partition plate: the partition plate adopts a composite PP structure, and includes two superficial layers and one middle layer; the melting point of the superficial layer is 140° C.; the middle layer is an ion insulating layer with a melting point of 165° C., and the thickness of the partition plate is 50 μm.

Comparative Embodiment 2

The preparation steps (1) to (3) are the same as those of Embodiment 1.

(4) Preparing an electrode assembly A and an electrode assembly B: Stacking the double-side-coated negative electrode plate, the separator, and the double-side-coated positive electrode plate in sequence to form a stacked plate, and then fixing the four corners of the entire stacked plate structure for future use, where each electrode assembly includes one positive tab and one negative tab. The separator is a 15 μm-thick polyethylene (PE) film.

(5) Electrolyte injection and sealing: Packaging the electrode assemblies A and B in an aluminum foil separately, and then the sealing the peripheral edge of the package. Injecting an electrolytic solution separately into hermetic cavities that accommodate the electrode assemblies A and B, and performing chemical formation (by charging at a constant current of 0.02 C until the voltage reaches 3.3 V. and then charging at a constant current of 0.1 C until the voltage reaches 3.6 V). Then leading all the tabs of the electrode assemblies A and B out of the aluminum plastic film.

(6) Connecting in series: Stacking the electrode assemblies A and B in the thickness direction, and welding the positive tab of the electrode assembly A and the negative tab of the electrode assembly B together by means of laser welding to implement series connection and conduction. Packaging the main bodies of the two electrode assemblies together in a housing to complete the assembling of the battery.

The data and test results of the embodiments and comparative embodiments are shown in Table 1.

TABLE 1

| | Material of bipolar current collector | Thickness of bipolar current collector (μm) | Double- or single-side coated | Ending structure of electrode assembly A | Ending structure of electrode assembly B | Quantity of electrode assemblies connected in series | Lead-out tabs of bipolar current collector |
|---|---|---|---|---|---|---|---|
| Embodiment 1 | Copper-aluminum composite current collector | 30 | Double-side | Negative electrode + separator | Positive electrode + separator | 2 | No |
| Embodiment 2 | Inserting conductive carbon fiber into a PE substrate | 30 | Double-side | Negative electrode + separator | Positive electrode + separator | 2 | No |
| Embodiment 3 | Stainless steel metal foil | 30 | Double-side | Negative electrode + separator | Positive electrode + separator | 2 | No |
| Embodiment 4 | Inserting conductive carbon fiber into a PE substrate | 6 | Double-side | Negative electrode + separator | Positive electrode + separator | 2 | No |
| Embodiment 5 | Inserting conductive carbon fiber into a PE substrate | 100 | Double-side | Negative electrode + separator | Positive electrode + separator | 2 | No |
| Embodiment 6 | Inserting conductive carbon fiber into a PE substrate | 55 | Double-side | Negative electrode + separator | Positive electrode + separator | 2 | No |
| Embodiment 7 | Copper-aluminum composite current collector | 30 | Double-side | Negative electrode + separator | Positive electrode + separator | 2 | Yes |
| Embodiment 8 | Inserting conductive carbon fiber into a PE substrate | 30 | Double-side | Negative electrode + separator | Positive electrode + separator | 2 | Yes |
| Embodiment 9 | SUS metal foil | 30 | Double-side | Negative electrode + separator | Positive electrode + separator | | Yes |
| Embodiment 10 | Inserting conductive carbon fiber into a PE substrate | 30 | Double-side | Negative electrode + separator | Positive electrode + separator | 3 | No |
| Embodiment 11 | Inserting conductive carbon fiber into a PE substrate | 30 | Single-side | Negative electrode + separator | Separator | 2 | Yes |
| Embodiment 12 | inserting conductive carbon fiber into a PE substrate | 30 | Single-side | Negative electrode + separator | Negative current collector | 2 | No |
| Embodiment 13 | Inserting conductive carbon fiber into a PE substrate | 30 | Single-side | Negative electrode + separator | Negative current collector | 2 | No |

TABLE 1-continued

| | | | | Ending structure of electrode assembly A | Ending structure of electrode assembly B | | |
|---|---|---|---|---|---|---|---|
| Embodiment 14 | Copper-aluminum composite current collector | 10 | Double-side | Negative electrode + separator | Positive electrode + separator | 2 | No |
| Embodiment 15 | Copper-aluminum composite current collector | 40 | Double-side | Negative electrode + separator | Positive electrode + separator | 2 | No |
| Embodiment 16 | Copper-aluminum composite current collector | 25 | Double-side | Negative electrode + separator | Positive electrode + separator | 2 | No |
| Embodiment 17 | Copper-aluminum composite current collector | 30 | Double-side | Negative electrode + separator | Positive electrode + separator | 2 | No |
| Comparative Embodiment 1 | PP | 30 | — | — | — | 2 | No |
| Comparative Embodiment 2 | — | — | — | — | — | 2 | No |

| | Energy density (Wh/L) | Alternating-current impedance (IMP) (mOhm) | Self-discharge rate (mV/h) | Charging temperature rise (° C.) | Nail penetration test pass rate |
|---|---|---|---|---|---|
| Embodiment 1 | 598 | 44 | 0.03 | 18 | 6 of 10 |
| Embodiment 2 | 597 | 38 | 0.03 | 25 | 8 of 10 |
| Embodiment 3 | 597 | 55 | 0.03 | 19 | 9 of 10 |
| Embodiment 4 | 599 | 46 | 0.04 | 19 | 7 of 10 |
| Embodiment 5 | 592 | 44 | 0.03 | 22 | 8 of 10 |
| Embodiment 6 | 595 | 45 | 0.05 | 19 | 8 of 10 |
| Embodiment 7 | 598 | 36 | 0.03 | 17 | 7 of 10 |
| Embodiment 8 | 597 | 39 | 0.03 | 18 | 7 of 10 |
| Embodiment 9 | 597 | 38 | 0.03 | 16 | 6 of 10 |
| Embodiment 10 | 602 | 87 | 0.07 | 29 | 5 of 10 |
| Embodiment 11 | 599 | 35 | 0.05 | 16 | 8 of 10 |
| Embodiment 12 | 598 | 58 | 0.05 | 17 | 8 of 10 |
| Embodiment 13 | 598 | 38 | 0.03 | 24 | 7 of 10 |
| Embodiment 14 | 599 | 42 | 0.03 | 17 | 7 of 10 |
| Embodiment 15 | 596 | 36 | 0.03 | 18 | 6 of 10 |
| Embodiment 16 | 598 | 45 | 0.03 | 18 | 6 of 10 |
| Embodiment 17 | 597 | 45 | 0.03 | 21 | 6 of 10 |
| Comparative Embodiment 1 | 588 | 38 | 0.03 | 26 | 8 of 10 |
| Comparative Embodiment 2 | 556 | 37 | 0.03 | 25 | 8 of 10 |

Note:
The ending structure of the electrode assembly A means a structure that is of the electrode assembly A and that is adjacent to the bipolar current collector; and the ending structure of the electrode assembly B means a structure that is of the electrode assembly B and that is adjacent to the bipolar current collector.

As can be seen from the foregoing embodiments, the bipolar current collector can increase the energy density by approximately 2% in contrast to an insulation baffle. Therefore, the bipolar current collector serving as a partition plate that connects the electrode assemblies in series not only increases the output voltage and reduces the charging temperature rise, but also increases the current density of the battery, and is highly practicable in the industry. When a metallic bipolar current collector is in use, the charging temperature rise of the battery is low, possibly because the metallic bipolar current collector is more capable of conducting heat to the outer package.

The foregoing descriptions are merely exemplary embodiments of this application, but are not intended to limit this application. Any modifications, equivalent substitutions, and improvements made without departing from the spirit and principle of this application fall within the protection scope of this application.

What is claimed is:

1. An electrochemical device, comprising:
a bipolar current collector,
wherein the bipolar current collector is hermetically connected to an outer package, cavities independent of each other are formed on two opposite sides of the bipolar current collector, an electrode assembly and an electrolytic solution are encapsulated in each cavity, an electrode active material is disposed on at least one surface of the bipolar current collector, and the electrode assemblies in adjacent cavities are connected in series, and
wherein a thickness of the electrode active material on the at least one surface of the bipolar current collector is in a range of 30 μm to 120 μm.

2. The electrochemical device according to claim 1, wherein the electrode active material is disposed on a first surface of the bipolar current collector, a polarity of the electrode active material is opposite to a polarity of an outermost electrode plate of an electrode assembly adjacent to the first surface, and a separator is disposed between the outermost electrode plate and the bipolar current collector; and a second surface of the bipolar current collector is electrically insulated from an electrode assembly adjacent to the second surface.

3. The electrochemical device according to claim 2, wherein bipolar current collector tabs are disposed on the bipolar current collector, and the bipolar current collector tabs are connected in parallel to tabs of a same polarity in the electrode assembly adjacent to the first surface.

4. The electrochemical device according to claim 1, wherein electrode active materials of different polarities are disposed on two surfaces of the bipolar current collector respectively, a polarity of an outermost electrode plate of an electrode assembly adjacent to each surface is different from a polarity of the electrode active material on said surface, and a separator is disposed between the outermost electrode plate of the electrode assembly and the bipolar current collector.

5. The electrochemical device according to claim 4, wherein two tabs of opposite polarities are disposed on the electrochemical device, and the electrode assemblies of the electrochemical device are connected in series between the two tabs of the electrochemical device.

6. The electrochemical device according to claim 4, wherein two tabs of opposite polarities are disposed on each of the electrode assemblies, and one of the tabs of the electrode assemblies is connected in series to an opposite polarity tab of an adjacent electrode assembly.

7. The electrochemical device according to claim 4, wherein a monitoring tab is disposed on the bipolar current collector, and the monitoring tab is configured to monitor operating status of the electrode assemblies on the two opposite sides of the bipolar current collector.

8. The electrochemical device according to claim 5, wherein a monitoring tab is disposed on the bipolar current collector, and the monitoring tab is configured to monitor operating status of the electrode assemblies on the two opposite sides of the bipolar current collector.

9. The electrochemical device according to claim 6, wherein a monitoring tab is disposed on the bipolar current collector, and the monitoring tab is configured to monitor operating status of the electrode assemblies on the two opposite sides of the bipolar current collector.

10. The electrochemical device according to claim 6, wherein a connecting tab is further disposed on the bipolar current collector, and the connecting tab is connected to the tab that serially connects the electrode assemblies on the two opposite sides of the bipolar current collector.

11. The electrochemical device according to claim 1, wherein the bipolar current collector is a metallic bipolar current collector or a composite bipolar current collector.

12. The electrochemical device according to claim 11, wherein the metallic bipolar current collector comprises one selected from the group consisting of a stainless steel bipolar current collector, a Ni bipolar current collector, a Ti bipolar current collector, an Ag bipolar current collector, an Au bipolar current collector, and a Pt bipolar current collector; and the composite bipolar current collector comprises one selected from the group consisting of a copper-aluminum composite current collector and a polymer-metal composite current collector.

13. The electrochemical device according to claim 1, wherein a thickness of the bipolar current collector is 6 μm to 100 μm.

14. The electrochemical device according to claim 1, wherein the electrode active material comprises a positive active material or a negative active material, the positive active material comprises at least one selected from the group consisting of lithium nickel cobalt manganese oxide, lithium nickel cobalt aluminum oxide, lithium iron phosphate, lithium cobalt oxide, lithium manganese oxide, lithium manganese iron phosphate, or lithium titanium oxide; and the negative active material comprises at least one of artificial graphite, natural graphite, mesocarbon microbead, soft carbon, hard carbon, silicon, silicon-carbon compound, and lithium titanium oxide.

15. The electrochemical device according to claim 1, wherein the bipolar current collector further comprises a sealing region, the sealing region is located at a peripheral edge of the bipolar current collector, the sealing region comprises a sealing material, and the sealing material comprises at least one selected from the group consisting of polypropylene, acid anhydride modified polypropylene, polyethylene, poly(ethylene-co-vinyl acetate), poly(ethylene-co-ethyl acrylate), poly(ethylene-co-acrylate), poly(ethylene-co-vinyl alcohol), polyvinyl chloride, polystyrene, polyether nitrile, polyurethane, polyamide, polyester, poly (amorphous α-co-olefin), and a derivative thereof.

16. The electrochemical device according to claim 1, wherein the electrolytic solution is in one of the following states: a gel state, a solid state, and a liquid state.

17. The electrochemical device according to claim 1, wherein the cavities are hermetic cavities.

18. An electronic device, comprising the electrochemical device according to claim 1.

19. The electronic device according to claim 18, wherein the electrode active material is disposed on a first surface of the bipolar current collector, a polarity of the electrode active material is opposite to a polarity of an outermost electrode plate of an electrode assembly adjacent to the first surface, and a separator is disposed between the outermost electrode plate and the bipolar current collector; and a second surface of the bipolar current collector is electrically insulated from an electrode assembly adjacent to the second surface; or
  wherein the electrode active material is disposed on a first surface of the bipolar current collector, a polarity of the electrode active material is opposite to a polarity of an outermost electrode plate of an electrode assembly adjacent to the first surface, and a separator is disposed between the outermost electrode plate and the bipolar current collector; a second surface of the bipolar current collector is electrically connected to a current collector of an outermost electrode plate of an electrode assembly adjacent to the second surface, and a polarity of the outermost electrode plate of the electrode assembly adjacent to the second surface is opposite to the polarity of the electrode active material on the first surface; or
  wherein electrode active materials of different polarities are disposed on two surfaces of the bipolar current collector respectively, a polarity of an outermost electrode plate of an electrode assembly adjacent to each surface is different from a polarity of the electrode active material on said surface, and a separator is disposed between the outermost electrode plate of the electrode assembly and the bipolar current collector.

* * * * *